(12) United States Patent
Igarashi (10) Patent No.: US 7,793,500 B2
(45) Date of Patent: Sep. 14, 2010

(54) CONTROL APPARATUS FOR INTERNAL COMBUSTION ENGINE HAVING MOTOR-DRIVEN SUPERCHARGER

(75) Inventor: Osamu Igarashi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 312 days.

(21) Appl. No.: 11/817,347

(22) PCT Filed: Jun. 6, 2006

(86) PCT No.: PCT/JP2006/311694
§ 371 (c)(1),
(2), (4) Date: Aug. 29, 2007

(87) PCT Pub. No.: WO2006/137279
PCT Pub. Date: Dec. 28, 2006

(65) Prior Publication Data
US 2009/0222188 A1  Sep. 3, 2009

(30) Foreign Application Priority Data
Jun. 21, 2005  (JP) .............................. 2005-180955

(51) Int. Cl.
*F02B 33/44* (2006.01)
*F02B 37/12* (2006.01)
(52) U.S. Cl. ................... 60/611; 60/605.1; 60/605.2
(58) Field of Classification Search ................. 60/611, 60/605.1, 605.2; 701/103–104, 108
See application file for complete search history.

(56) References Cited
U.S. PATENT DOCUMENTS 4,774,812 A   10/1988  Hitomi et al.

| | | | |
|---|---|---|---|
| 6,216,676 B1 * | 4/2001 | Gotoh et al. | 123/568.21 |
| 6,363,721 B1 * | 4/2002 | Prenninger et al. | 60/611 |
| 6,983,597 B2 * | 1/2006 | Wild et al. | 60/611 |
| 2004/0206083 A1 | 10/2004 | Okuyama et al. | |

(Continued)

FOREIGN PATENT DOCUMENTS

DE   1 198 35 594 A1   2/2000

(Continued)

OTHER PUBLICATIONS

Machnine translation of EP 1 316 447 A1, Published on Jun. 4, 2003.*

(Continued)

*Primary Examiner*—Thai Ba Trieu
(74) *Attorney, Agent, or Firm*—Oblon, Spivak, McClelland, Maier & Neustadt, L.L.P.

(57) ABSTRACT

The air flow inhaled into the internal combustion engine is calculated based on the operation state of the electric motor, the operational state of the bypass valve and the signal of the intake air flow sensor. Immediately after the bypass valve is opened when the electric motor is running, the air flow inhaled into the internal combustion engine may be calculated by acquiring the bypass air flow through the bypass passage and using the acquired bypass air flow to correct the intake air flow measured from the signal of the intake air flow sensor. Based on the calculated air flow inhaled into the internal combustion engine, control parameters which concern the output power of the internal combustion engine are adjusted.

18 Claims, 7 Drawing Sheets

U.S. PATENT DOCUMENTS

2009/0107142 A1* 4/2009 Russell et al. .................. 60/608
2009/0198432 A1* 8/2009 Tabata et al. ................ 701/103

FOREIGN PATENT DOCUMENTS

| DE | 102 25 307 | 12/2003 |
| EP | 1 316 447 | 6/2003 |
| EP | 1 460 247 | 9/2004 |
| JP | 2001-123844 A | 5/2001 |
| JP | 2004 332715 | 11/2004 |
| JP | 2007071116 A * | 3/2007 |
| WO | WO 2004094176 A1 * | 11/2004 |

OTHER PUBLICATIONS

A machine translation copy of JP 2001-123844 A, published on Aug. 5, 2001.*

Japanese Office Action for Application 2005-180955 dated Jun. 8, 2010, 3 pages.

* cited by examiner

Fig. 1

Road information
(road's curvature, inclination, etc.)

Vehicle information
(distance from the car in front, steering angle, etc.)

CONTROL APPARATUS FOR INTERNAL COMBUSTION ENGINE HAVING MOTOR-DRIVEN SUPERCHARGER

TECHNICAL FIELD

The present invention relates to a control apparatus for an internal combustion engine having a motor-driven supercharger. In particulars the invention relates to a control apparatus for an internal combustion engine having a motor-driven supercharger wherein the compressor can be bypassed through a bypass passage between the downstream and upstream of the supercharger's compressor.

BACKGROUND ART

Setting a motor to the rotation axis of a turbocharger is known in conventional art. Such a motor-driven turbocharger is driven to assist the rotation of the compressor. It is therefore possible to attain a necessary level of boost pressure when necessary regardless of whether the exhaust energy supplied from the internals combustion engine is large or small. Thus, the motor-driven turbocharger can realize high boost pressure by forcibly driving the compressor even when the engine rotation speed is low, that is, when the exhaust gas flow to drive the turbine is low. However, the motor-driven turbocharger has a problem that the likelihood of exceeding the compressor's surge limit is high.

As a method to avoid surge, it is effective to secure a certain amount of air which passes the compressor. An internal combustion engine having a motor-driven supercharger, disclosed in Japanese Patent Laid-Open No. 2004-332715, is provided with a bypass passage between the upstream and downstream of the compressor to bypass the compressor and a bypass valve which opens and closes this bypass passage. According to this technique, the amount of air which passes the compressor can be increased to avoid surge. For this purpose, the air boosted by the compressor is partly returned to the upstream of the compressor by opening the bypass valve (hereinafter denoted as "air-bypass").

DISCLOSURE OF THE INVENTION

In the internal combustion engine, various kinds of control parameters which decide the output of the internal combustion engine, such as the fuel injection amount, are adjusted based on the intake air flow. Generally, the intake air flow is measured from the signal of an intake air flow sensor such as an air flow meter disposed at the inlet of the intake passage.

In this internal combustion engine having a motor-driven turbocharger, however, the air which has passed the compressor partly flows into the bypass passage if the bypass valve is opened to avoid surge. Until the pressure difference between the upstream and downstream of the bypass valve is settled as the bypass passage is filled with air, the amount of air inhaled into the intake passage is larger than the amount of air inhaled into the internal combustion engine.

Due to this, the air flow measured from the signal of the intake air flow sensor immediately after air-bypass is started is different from the actual air flow inhaled into the internal combustion engine. If the signal of the intake air flow sensor does not accurately represent the actual air flow inhaled into the internal combustion engine, the exhaust emission and fuel efficiency may deteriorate since it is not possible to accurately perform fuel injection amount control and other engine controls.

The present invention has been made in order to solve the above-mentioned problem. It is an object of the present invention to provide a control apparatus for an internal combustion engine having a motor-driven supercharger which is capable of avoiding inaccurate measurement of the air flow inhaled into the internal combustion engine during air-bypass and therefore controlling the internal combustion engine based on the accurately measured intake air flow.

In accomplishing the above object, according to a first aspect of the present invention, there is provided a control apparatus for an internal combustion engine comprising: a supercharger which is disposed in an intake passage and provided with an electric motor capable of assisting the rotation of the supercharger; a bypass passage which bypasses the downstream side of the supercharger to the upstream side of the supercharger in the intake passage; a bypass valve which opens and closes the bypass passage; and an intake air flow sensor which is disposed upstream of the supercharger in the intake passage and outputs a signal indicative of the air flow inhaled into the intake passage. The control apparatus includes: calculation means for calculating the air flow inhaled into the internal combustion engine based on the operational state of the electric motor, the operational state of the bypass valve and the signal of the intake air flow sensor; and control parameter adjustment means for adjusting control parameters which concern the output power of the internal combustion engine based on the air flow inhaled into the internal combustion engine.

According to the first aspect of the present invention, the air flow inhaled into the internal combustion engine is calculated based on the operational states of the electric motor and bypass valve and the signal of the intake air flow sensor and control parameters which concern the output power of the internal combustion engine are adjusted based on the calculated air flow into the combustion engine. Since the air flow inhaled actually into the internal combustion engine is thus determined, it is possible to avoid inaccurate measurement of the air flow inhaled into the internal combustion engine during the execution of air-bypass. Therefore, the internal combustion engine can be controlled based on the accurate intake air even during the execution of air-bypass.

According to a second aspect of the present invention, there is provided the control apparatus for an internal combustion engine having a motor-driven supercharger as described in the first aspect, wherein the calculation means calculate the air flow inhaled into the internal combustion engine immediately after the bypass valve is opened with the electric motor running by acquiring the bypass air flow going through the bypass passage from the downstream side to the upstream side of the supercharger and using the acquired bypass air flow to correct the intake air flow measured from the signal of the intake air flow sensor.

According to the second aspect of the present invention, the air flow inhaled into the internal combustion engine immediately after air-bypass is started can accurately be calculated by using the bypass air flow to correct the air flow inhaled into the intake passage.

According to a third aspect of the present invention, there is provided the control apparatus for an internal combustion engine having a motor-driven supercharger as described in the second aspect, wherein the calculation means calculate the bypass air flow from output pressure of a compressor of the supercharger, the output pressure of the compressor being calculated based on the intake air flow and rotation speed of the supercharger, and the opening of the bypass valve.

According to the third aspect of the present invention, the bypass air flow can be measured without installing an air flow sensor in the bypass passage. In addition, it is not necessary to install a pressure sensor to measure the output pressure of the compressor.

According to a fourth aspect of the present invention, there is provided the control apparatus for an internal combustion engine having a motor-driven supercharger as described in the first aspect, wherein the calculation means calculate the air flow inhaled into the internal combustion engine immediately after the bypass valve is opened with the electric motor running by smoothing the signal of the intake air flow sensor and taking the intake air flow measured from the smoothed signal as the intake air flow inhaled into the internal combustion engine.

According to the fourth aspect of the present invention, the signal of the intake air flow sensor is smoothed immediately after air-bypass is started. This can reduce the difference between the intake air flow measured from the signal of the intake air flow sensor and the actual air flow inhaled into the internal combustion engine.

According to a fifth aspect of the present invention, there is provided the control apparatus for an internal combustion engine having a motor-driven supercharger as described in the first aspect, wherein the calculation means calculate the air flow inhaled into the internal combustion engine immediately after the bypass valve is opened with the electric motor running by predicting the maximum value of the air flow to be inhaled into the internal combustion engine based on the rotation speed and throttle opening of the internal combustion engine, setting the maximum value as the upper limit to the intake air flow measured from the signal of the intake air flow sensor and taking the result as the air flow inhaled into the internal combustion engine.

According to the fifth aspect of the present invention, the intake air flow measured from the signal of the intake air flow sensor immediately after air-bypass is started is limited by the maximum air flow to be inhaled into the internal combustion engine. The maximum air flow is predicted based on the rotation speed and throttle opening of the internal combustion engine. This can reduce the difference between the intake air flow measured from the signal of the intake air flow sensor and the actual air flow inhaled into the internal combustion engine.

According to a sixth aspect of the present invention, there is provided the control apparatus for an internal combustion engine having a motor-driven supercharger as described in any one of the first through fifth aspects, wherein the internal combustion engine further comprises: an EGR apparatus which introduces part of the exhaust gas into the intake passage at an exhaust gas inlet downstream of the throttle; and a gas property sensor which is disposed downstream of the exhaust gas inlet and outputs a signal indicative of the pressure or flow of the gas inhaled into the internal combustion engine, wherein the calculation means calculate the air flow inhaled into the internal combustion engine based on the signal of the gas property sensor when the EGR apparatus is not active, and calculate the air flow inhaled into the internal combustion engine based on the operational state of the electric motor, the operational state of the bypass valve and the signal of the intake air flow sensor when the EGR apparatus is active.

The air flow inhaled into the internal combustion engine can be measured if a gas property sensor which is disposed downstream of the throttle outputs a signal indicative of the gas pressure or flow. However, if exhaust gas is introduced into the intake passage by an EGR apparatus, the exhaust gas flow causes difference between the gas flow measured from the signal of the gas property sensor and the air flow inhaled actually into the engine. According to the sixth aspect of the present invention, when the EGR apparatus is not active, the air flow inhaled into the engine can be accurately calculated based on the signal of the gas property sensor. When the EGR is active, the air flow inhaled into the internal combustion engine is calculated based on the operational state of the electric motor, the operational state of the bypass valve and the signal of the intake air flow sensor. Thus, the air flow inhaled into the engine can accurately be calculated even when exhaust gas is introduced into the intake passage.

According to a seventh aspect of the present invention, there is provided the control apparatus for an internal combustion engine having a motor-driven supercharger as described in any one of the first through sixth aspects, further comprising surge avoidance means which judges the surge condition of the supercharger when the electric motor is running and, if it is judged that surge avoidance should be done, opens the bypass valve.

According to the seventh aspect of the present invention, the bypass valve is opened depending on the surge condition of the supercharger, making it possible to avoid surge when the supercharger is driven by the electric motor.

According to an eighth aspect of the present invention, there is provided the control apparatus for an internal combustion engine having a motor-driven supercharger as described in any one of the first through seventh aspects, further comprising: torque buildup request prediction means for predicting a torque buildup request from the driver in advance based on road information or vehicle information; and pre-assist means for raising the rotation speed of the supercharger by running the electric motor if the torque buildup request is predicted.

According to the eighth aspect of the present invention, the rotation speed of the supercharger is raised before torque buildup becomes actually required. This can improve the output response to requests for higher torques.

In accomplishing the above object, according to a ninth aspect of the present invention, there is provided a control apparatus for an internal combustion engine comprising: a supercharger which is disposed in an intake passage and provided with an electric motor capable of assisting the rotation of the supercharger; a bypass passage which bypasses the outlet side of the supercharger in the intake passage to the inlet side of the supercharger; a bypass valve which opens and closes the bypass passage; and an intake air flow sensor which is disposed upstream of the supercharger in the intake passage and outputs a signal indicative of the air flow inhaled into the intake passage; wherein, the control apparatus includes: control parameter adjustment means for adjusting control parameters which concern the output power of the internal combustion engine based on the air flow inhaled into the internal combustion engine; torque buildup request prediction means for predicting a torque buildup request from the driver in advance based on road information or vehicle information; pre-assist means for raising the rotation speed of the supercharger by running the electric motor if said torque buildup request is predicted; and valve control means for opening the bypass valve before running the electric motor if the torque buildup request is predicted.

According to the ninth aspect of the present invention, when the electric motor is going to be run to raise the rotation speed of the supercharger before torque buildup becomes actually required, the bypass valve is opened before running the electric motor. This can reduce the difference between the intake air flow measured from the signal of the intake air flow sensor and the air flow inhaled actually into the internal combustion engine since compression of intake air by the supercharger is suppressed. It is therefore possible to control the internal combustion engine based on the accurate air flow inhaled into the engine even during the execution of air-bypass.

BEST MODE FOR CARRYING OUT THE INVENTION

First Embodiment

The following will describe a first embodiment of the present invention with reference to FIGS. 1 through 5.

[Description of Engine System Configuration]

Figure 1:
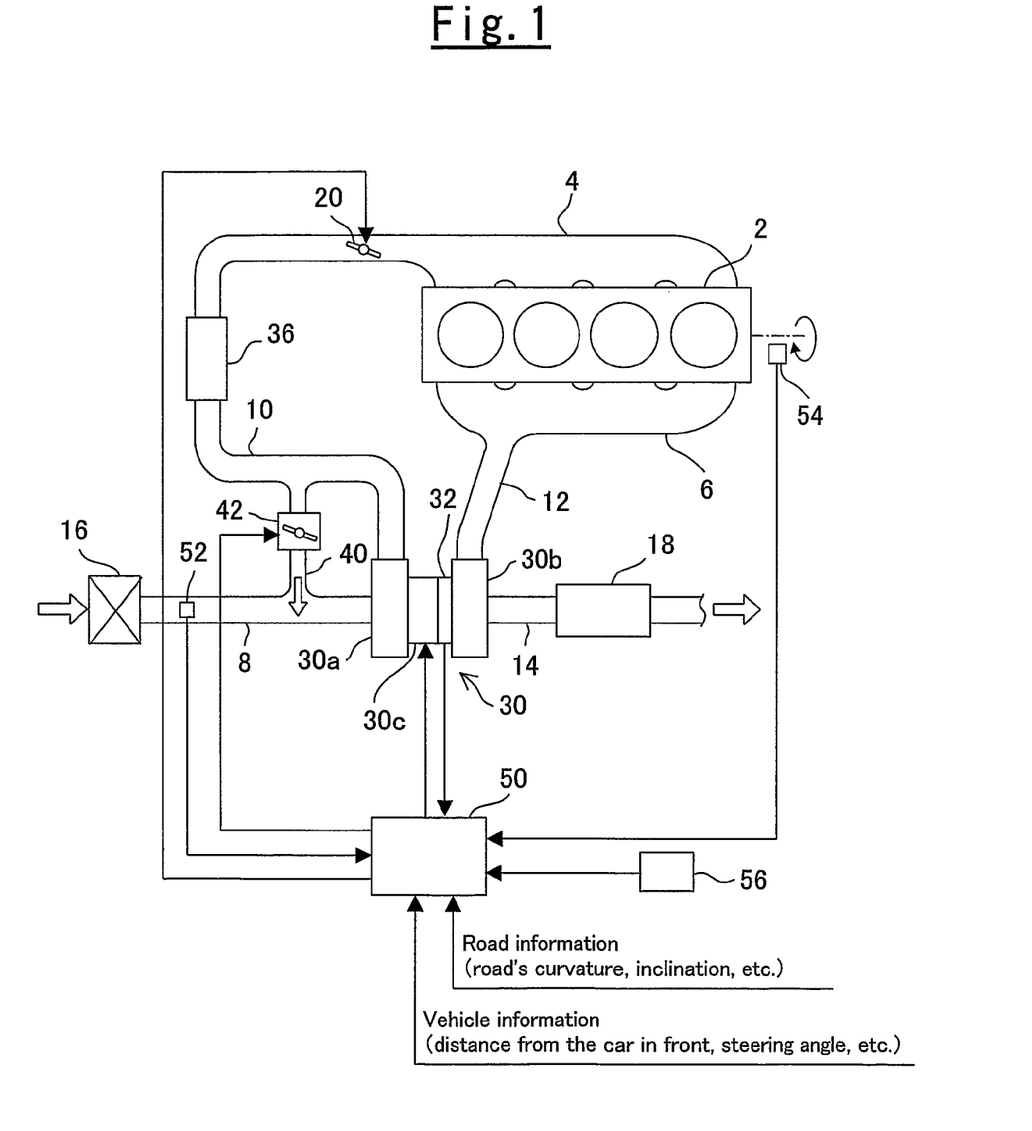
FIG. 1 schematically shows the configuration of an internal combustion engine having a motor-driven supercharger according to the first embodiment of the present invention.

FIG. 1 schematically shows the configuration of an internal combustion engine having a motor-driven supercharger to which a control apparatus, the first embodiment of the present invention, is applied. In the present embodiment, the present invention is applied to a gasoline engine (hereinafter, denoted simply as the engine). This engine comprises an engine body 2 which has a plurality of cylinders (four cylinders in FIG. 1). To the engine body 2, an intake manifold 4 to distribute air the respective cylinders and an exhaust manifold 6 to gather exhaust gas from the respective cylinders.

This engine is provided with a motor-driven turbocharger (motor assist turbocharger, hereinafter denoted as the MAT) 30. The MAT 30 comprises of a compressor 30a, a turbine 30b and an electric motor 30c disposed between the compressor 30a and the turbine 30b. The compressor 30a and the turbine 30b are coupled together on a connecting shaft. The compressor 30a is driven to rotate by the exhaust energy of the exhaust gas introduced to the turbine 30b. The connecting shaft also serves as the rotor of the electric motor 30c, making it possible to forcibly drive the compressor 30a by actuating the electric motor 30c. In addition, the coupling shaft is provided with a turbo rotation speed sensor 32 which outputs a signal indicative of the rotation speed (number of rotations per certain time) of the compressor 30a.

The compressor 30a is disposed half way between the intake passages 8 and 10 which lead to the intake manifold 4. The intake passage 10 which connects the outlet of the compressor 30a to the intake manifold 4 is provided with an intercooler 36 to cool the boosted air. Near the intake manifold 4, the intake passage 10 is also provided with a throttle valve 20 for controlling the air flow inhaled into the engine body 2.

The air to be supplied to the engine body 2 is taken in from the atmosphere via an air cleaner 16. The intake passage 8 which connects the air cleaner 16 to the inlet of the compressor 30a is provided with an air flow meter 52 which outputs a signal indicative of the air flow inhaled into the intake passage 8.

This engine has a bypass passage 40 which bypasses the compressor 30a by connecting the outlet and inlet of the compressor 30a. One end of the bypass passage 40 is connected to the downstream of the air flow meter 52 in the intake passage 8 while the other end is connected to the upstream of the throttle valve 20 in the intake passage 10. The bypass passage 40 is provided with a bypass valve 42 for controlling the amount of air (bypassed air) which flows therein.

To the inlet of the turbine 30b, an exhaust passage 12 is connected. The other end of the exhaust passage 12 is connected to the exhaust manifold 6. The exhaust gas gathered by the exhaust manifold 6 from the respective cylinders is supplied to the turbine 30b through the exhaust passage 12. To the outlet of the turbine 30b, the other exhaust passage 14 is connected. In this exhaust passage 14, a catalyst 18 is disposed for clarifying the exhaust gas.

As a control unit for general control of the whole engine, an ECU (Electronic Control Unit) 50 is provided. This ECU 50 includes a motor controller which controls the power to be supplied to the electric motor 30c, that is, controls the rotation of the MAT 30. In addition to the electric motor 30c, various devices such as the throttle valve 20 and bypass valve 42 are connected to the output side of the ECU 50.

On the other hand, the input side of the ECU 50 is connected to various kinds of sensors including not only the aforementioned air flow meter 52 and turbo rotation speed sensor 32 but also an engine rotation speed sensor 54 which outputs a signal indicative the engine rotation speed and an accelerator opening sensor 56 which outputs a signal indicative of the accelerator opening. In addition to these sensor signals, road information and vehicle information are also input to the ECU 50. The road information includes the current road's curvature, inclination, etc. The vehicle information includes the vehicle's distance from the nearest one in front of it, steering angle, etc. The road information can be obtained from, for example, a GPS-used navigation system. The vehicle information is available from on-vehicle sensors (such as a forward radar). Based on the respective sensor signals and other input information, the ECU 50 drives each device according to a certain control program.

[Description of Assist Control]

One of the engine controls the ECU 50 implements is fuel injection amount control to control the amount of fuel injected from the injectors (not illustrated). In this fuel injection amount control, a fuel injection amount is calculated based on the intake air flow measured from the signal of the air flow meter 52 so as to make the air-fuel ratio equal to the predetermined target ratio wherein the air-fuel ratio is the mass of air inhaled into the engine system divided by the mass of fuel injected into the cylinders.

Another engine control the ECU 50 performs is assist control to assist the rotation of the compressor 30a by the electric motor 30*c*. The assist control is performed by a separate routine concurrently with the above-mentioned fuel injection amount control. During execution of the assist control, bypass valve 42 opening and closing control is also performed in order to prevent the compressor 30*a* from causing surge.

However, if the bypass valve 42 is opened to execute air-bypass while the electric motor 30*c* is operating, a transient difference occurs between the amount of intake air measured from the air flow meter 52 and the amount of air inhaled actually into the engine body 2. As mentioned above, the fuel injection amount control uses the signal of the air flow meter 52. To satisfactorily maintain the exhaust emission and fuel efficiency, the fuel injection amount must be controlled to the target amount based on the actual amount of air inhaled into the engine body 2.

Figure 2:
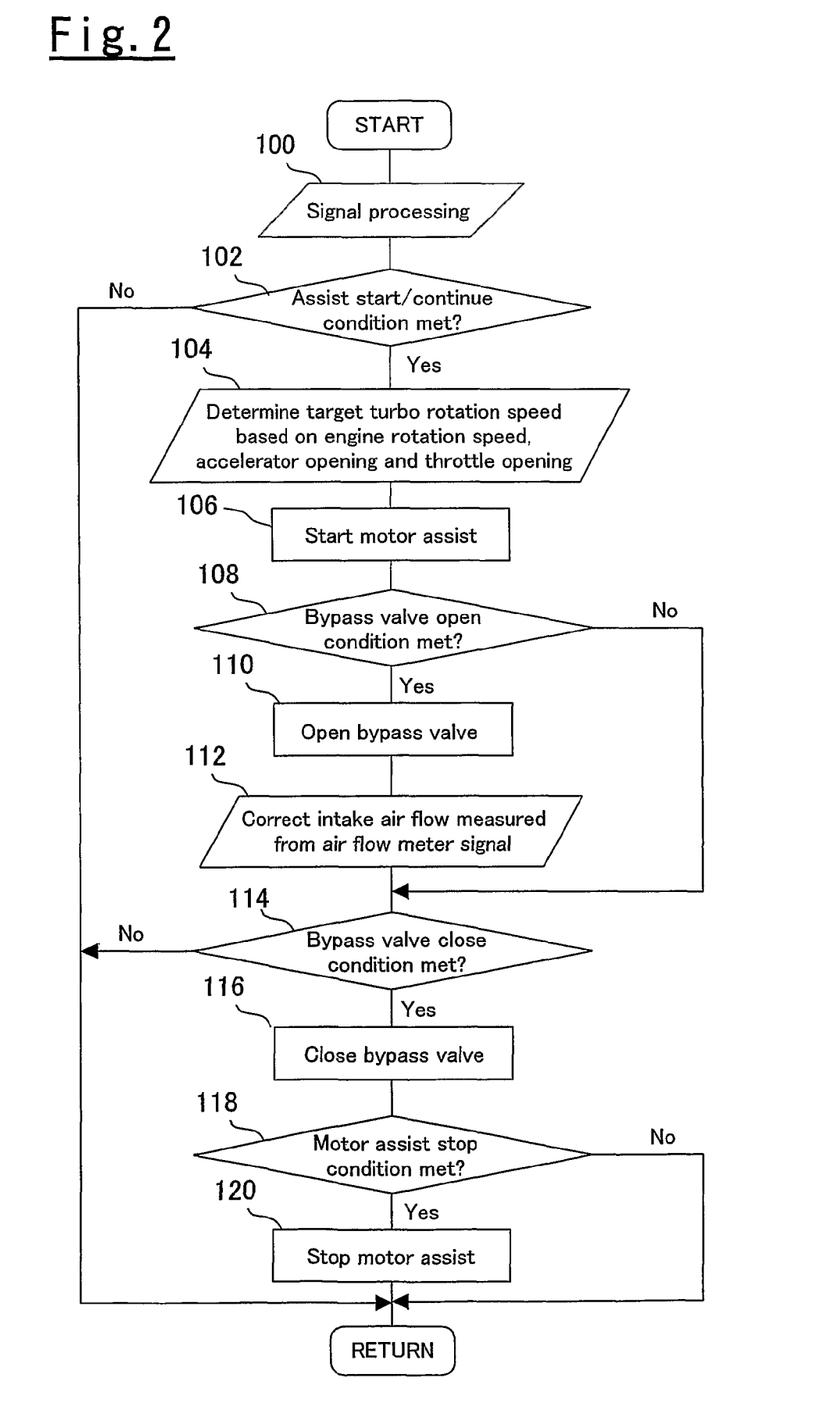
FIG. 2 is a flowchart illustrating an assist control routine that is executed by the first embodiment of the present invention.

Accordingly, fuel injection amount control and assist control are interrelated as described below in the present embodiment. The intake air flow is corrected according to the situation of the assist control. The fuel injection amount can be controlled based on the corrected intake air flow. FIG. 2 provides a flowchart showing an assist control routine which the ECU 50 executes. Execution of this assist control routine includes correction of the intake air flow.

At the first step 100 of the routine shown in FIG. 2, signals entered into the ECU 50 from individual sensors are processed. In the assist control, signals from the accelerator opening sensor 56, engine rotation speed sensor 54, turbo rotation speed sensor 32 and air flow meter 52 are used.

At the next step 102, it is judged based on the input signals processed at step 100 whether a predefined "assist start/continue" condition is met. Specifically, the ECU 50 refers to an operating state judgment map prepared in advance, and from the engine rotation speed and accelerator opening, judges whether the current operating state of the engine needs motor assist. Motor assist is judged needed, for example, if a higher torque is needed although the exhaust energy is too low to drive the MAT 30 (low speed and high load state). If the current operating state of the engine needs motor assist, the "assist start/continue" condition is met. On the other hand, if the operating state does not need motor assist, this routine terminates since the "assist start/continue" condition is not met.

If the "assist start/continue" condition is met at step 102, step 104 and the subsequent steps are performed. Firstly, at step 104, a target turbo rotation speed is determined for the MAT 30 based on the input signals processed at step 100. Specifically, the ECU 50 determines the target turbo rotation speed from a multi-dimensional map (motor control map) where the engine rotation speed, accelerator opening and throttle opening are represented along their corresponding axes. After the target turbo rotation speed is determined, the ECU 50 supplies power to the electric motor 30*c* according to the target turbo rotation speed to start the assist by the electric motor 30*c* (step 106).

During execution of the motor assist, it is judged whether a "bypass valve 42 open" condition is met (step 108). The "bypass valve 42 open" condition means that the compressor 30*a* has reached the surge limit. Whether the surge limit is reached can be judged from the pressure ratio of the output pressure to the input pressure (atmospheric pressure) of the compressor 30*a* and the intake air flow indicated by the signal of the air flow meter 52. If the relation between the pressure ratio and the intake air flow exceeds a predefined surge line, it is judged that the compressor 30*a* has reached the surge limit.

If a pressure sensor is disposed between the compressor 30*a* and the throttle valve 20, the output pressure of the compressor 30*a* may be measured from the signal of this pressure sensor. In the present embodiment, however, the output pressure of the compressor 30*a* is calculated from the turbo rotation speed measured by the turbo rotation speed meter 32 and the intake air flow. Specifically, the output pressure of the compressor 30*a* is determined from a map where the turbo rotation speed and the intake air flow are represented along their corresponding axes.

If the "bypass valve open" condition is met at step 108, namely the compressor 30*a* has reached the surge limit, the bypass valve 42 is opened (step 110). The bypass valve 42 is normally closed. If the bypass valve 42 is opened, the air compressed by the compressor 30*a* is partly returned to the upstream of the compressor 30*a* through the bypass passage 40. Thus, the compressor 30*a* is prevented from causing surge since air-bypass is performed to increase the amount of air which passes the compressor 30*a*.

If the bypass valve 42 is opened to perform air-bypass at step 110, the amount of air flowing through the bypass passage 40 settles to a certain steady level. After the steady level is reached, the intake air flow indicated by the signal of the air flow meter 52 agrees with the amount of air which is actually inhaled into the engine body 2. However, until the bypass passage 40 is filled with air to settle the amount of air flowing through it, more air is inhaled into the intake passage 8 than inhaled actually into the engine body 2. Therefore, a transient difference occurs between the intake air flow indicated by the signal of the air flow meter 52 and the air flow inhaled into the engine body 2.

Accordingly, correction of the intake air flow measured from the signal of the air flow meter 52 is performed at step 112 until the bypass air flow settles to a steady level. Specifically, according to equation (1) below, the amount of air which is actually inhaled into the engine body 2 (actual intake air flow) is calculated by subtracting the amount of bypassed air (bypass air flow) from the amount of intake air measured from the signal of the air flow meter 52 (measured intake air flow). The bypass air flow can be calculated from the pressure difference between the upstream and downstream of the bypass valve 42, or the difference between the output pressure and input pressure (atmospheric pressure) of the compressor 30*a*, and the aperture area of the bypass valve 42.

$$\text{Actual Intake Air Flow} = \text{Measured Intake Air Flow} - \text{Bypass Air Flow} \quad (1)$$

In a transient period immediately after air-bypass is started, the actual intake air flow calculated by the above equation (1) is used in the fuel injection amount control.

If the bypass air flow settles after air-bypass was started, correction of the intake air flow according to the above-mentioned equation (1) is terminated. Since then, the intake air flow measured from the signal of the air flow meter 52 is directly used in the fuel injection amount control. Whether the bypass air flow has settled can be judged from the change of the pressure difference between the upstream and downstream of the bypass valve 42, namely the change of the difference between output pressure and input pressure of the compressor 30*a*.

If the "bypass valve 42 open" condition is not met at step 108, that is, the compressor 30*a* has not reached the surge limit, air-bypass is not performed since processing of step 110 is skipped. In this case, the intake air flow is not corrected since processing of step 112 is also skipped. That is, while the bypass valve 42 is closed, the intake air flow measured from the signal of the air flow meter 52 is directly used in the fuel injection amount control.

At step 114, it is judged whether a "bypass valve 42 close" condition is met. The "bypass valve 42 close" condition means that the surge of the compressor 30a is avoided. It is judged that the surge of the compressor 30a is avoided if the relation between the ratio of the output pressure to the input pressure of the compressor 30a and the intake air flow falls below the surge line. If the "bypass valve close" condition is met, that is, the surge of the compressor 30a is avoided, the bypass valve 42 is closed (step 116). If the "bypass valve close" condition is not met, the bypass valve 42 is kept open and processing of the step 116 and the subsequent steps are skipped.

If the bypass valve 42 is closed, it is judged at the next step 118 whether a "motor assist stop" condition is met. Specifically, the ECU 50 compares the actual turbo rotation speed measured by the turbo rotation speed sensor 32 with the target turbo rotation speed determined at step 104. If the actual turbo rotation speed has reached the target turbo rotation speed, the "motor assist stop" condition is met. Until the "motor assist stop" condition is met, processing of the next step 120 is skipped to continue the motor assist. If the "motor assist stop" condition is met, power supply from the ECU 50 to the electric motor 30c is stopped to terminate the assist by the electric motor 30c (step 120).

According to the above-mentioned routine as described so far, it is possible to accurately calculate the intake air flow inhaled into the engine body 2 even in a transient state which occurs immediately after air-bypass is started during execution of motor assist when air-bypass is performed in order to avoid surge by subtracting the bypass air flow from the amount of air inhaled into the intake passage 8. Therefore, the fuel injection amount control can be performed based on the accurate intake air flow. That is, it is possible to realize the target air-fuel ratio to satisfactorily maintain the exhaust emission and fuel efficiency even when air-bypass is performed in order to avoid surge.

Note that in the present embodiment, "calculation means" according to the first aspect of the present invention is realized by the ECU 50 through execution of the aforementioned routine's step 112. In addition, "control parameter adjustment means" according to the first aspect of the present invention is realized by the ECU 50 through execution of the fuel injection amount control based on the intake air flow corrected at step 112. In addition, "surge avoidance means" according to the seventh aspect of the present invention is realized by the CPU 50 through execution of step 108.

[Description of Pre-assist Control]

In addition to the assist control which drives the electric motor 30a when a higher torque is actually needed, the ECU 50 in the present embodiment can perform pre-assist control. The pre-assist control predicts a torque buildup request from the driver and raises the turbo rotation speed by driving the electric motor 30c before a higher torque becomes actually needed. According to this pre-assist control, the time lag required for the boost pressure to be raised by the rotation of the compressor 30a can be eliminated. It is therefore possible to improve the output response to requests for higher torques for acceleration, climbing and so on.

Similar to the assist control, this pre-assist control is performed by a separate routine concurrently with the above-mentioned fuel injection amount control. During execution of the pre-assist control, bypass valve 42 is opened to perform air-bypass so as to prevent the compressor 30a from causing surge while the turbo rotation speed is raised quickly. Therefore, as in the assist control, in a transient state immediately after air-bypass is started, a transient difference occurs between the amount of intake air measured from the signal of the air flow meter 52 and the amount of air inhaled actually into the engine body 2.

Figure 3:
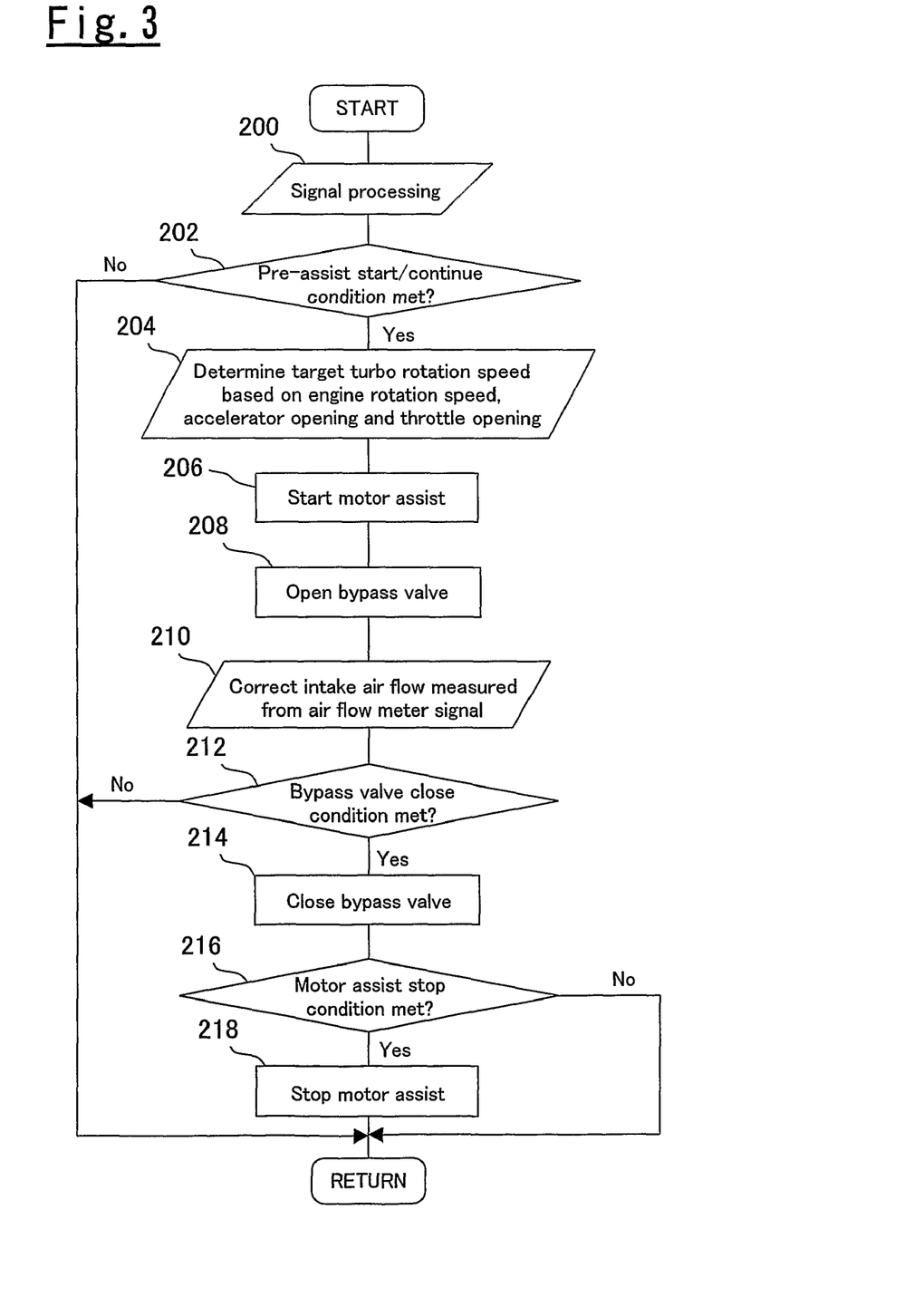
FIG. 3 is a flowchart illustrating a pre-assist control routine that is executed by the first embodiment of the present invention.
Figure 4:
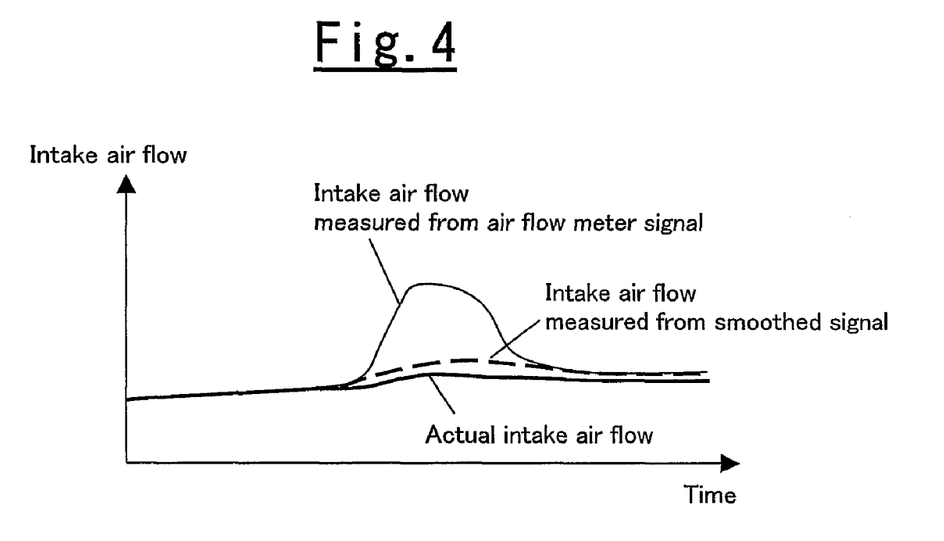
FIG. 4 is a graph that shows an intake air flow correction method in the pre-assist control according to the first embodiment of the present invention.

Accordingly, the fuel injection amount control and the pre-assist control are interrelated as described below in the present embodiment. The intake air flow is corrected according to the situation of the pre-assist control. The fuel injection amount can be controlled based on the corrected intake air flow. FIG. 3 provides a flowchart showing an pre-assist control routine which the ECU 50 executes. Execution of this pre-assist control routine includes correction of the intake air flow.

At the first step 200 of the routine shown in FIG. 3, signals entered into the ECU 50 from individual sensors are processed. In the pre-assist control, signals from the accelerator opening sensor 56, engine rotation speed sensor 54, turbo rotation speed sensor 32 and air flow meter 52 are used. Road information and vehicle information are also used in the pre-assist control.

At the next step, it is judged based on the input signals processed at step 200 whether a predefined "pre-assist start/continue" condition is met. Specifically, the ECU 50 judges whether the current traveling situation of the vehicle needs the pre-assist according to road information and vehicle information. The pre-assist is judged necessary if higher torque is expected to be required, for example, when the vehicle is going to be started on a slope, when the vehicle is approaching to an upward slope and when the vehicle is entering a straight road from a curved road. If the current traveling situation of the vehicle requires the pre-assist, the "pre-assist start/continue" condition is met. On the other hand, if the situation does not require the pre-assist, this routine is terminated since the "pre-assist start/continue" condition is not met.

If the "pre-assist start/continue" condition is met at step 202, step 204 and the subsequent steps are performed. Firstly, at step 204, a target turbo rotation speed is determined for the MAT 30 based on the input signals processed at step 200. Specifically, the ECU 50 determines the target turbo rotation speed from a multi-dimensional pre-assist map (motor control map) where the engine rotation speed, accelerator opening and throttle opening are represented along their corresponding axes. After the target turbo rotation speed is determined, the ECU 50 supplies power to the electric motor 30c according to the target turbo rotation speed to start the assist by the electric motor 30c (step 206).

After the assist by the electric motor 30c is started, the bypass valve 42 is opened (step 208). Since opening the bypass valve 42 bypasses the output side to the input side of the compressor 30a, the rise of the output pressure of the compressor 30a is suppressed although the turbo rotation speed rises. This makes it possible to quickly raise the turbo rotation speed to the target speed while avoiding the surge of the compressor 30a.

While air-bypass is being performed following the opening of the bypass valve 42 at step 208, the intake air flow measured from the signal of the air flow meter 52 is corrected at the next step 210. At this step, correction is done by smoothing the signal of the air flow meter 52. Namely, the intake air flow is measured from the smoothed signal. Note that although the signal is usually smoothed to remove noise, the signal is smoothed here several ten times more than usual. Determining the intake air flow from the smoothed signal can approximate the air flow inhaled actual into the engine body 2 (actual intake air flow) as shown FIG. 4, resulting in a reduced difference between the intake air flow measured from the signal of the air flow meter 52 and the actual intake air flow.

At step 212, it is judged whether a "bypass valve 42 close" condition is met. The "bypass valve 42 close" condition means that a torque buildup request is issued from the driver. Whether a torque buildup request is present can be judged from the engine rotation speed and the accelerator opening. If a torque buildup request is issued, the bypass valve 42 is closed (step 214) to raise the output pressure of the compressor 30a. On the other hand, if the "bypass valve close" condition is not met, the bypass valve 42 is kept open and processing of step 214 and the subsequent steps are skipped.

If the bypass valve 42 is closed, it is judged at the next step 216 whether a "motor assist stop" condition is met. Specifically, the ECU 50 compares the actual turbo rotation speed measured by the turbo rotation speed sensor 32 with the target turbo rotation speed determined at step 204. If the actual turbo rotation speed has reached the target turbo rotation speed, the "motor assist stop" condition is met. Until the "motor assist stop" condition is met, processing of the next step 218 is skipped to continue the motor assist. If the "motor assist stop" condition is met, power supply from the ECU 50 to the electric motor 30c is stopped to terminate the assist by the electric motor 30c (step 218).

According to the above-mentioned routine as described so far, it is possible to accurately determine the amount of air inhaled into the engine body 2 by smoothing the signal of the air flow meter 52 to reduce the difference between the intake air flow measured from the signal and the actual intake air flow into the engine body 2 when air-bypass is done during execution of the pre-assist. Therefore, the fuel injection amount control can be performed based on the accurate intake air flow. That is, it is possible to realize the target air-fuel ratio and satisfactorily maintain the exhaust emission and fuel efficiency even during the pre-assist.

Note that in the present embodiment, "calculation means" according to the first aspect of the present invention is realized by the ECU 50 through execution of the aforementioned routine's step 210. In addition, "control parameter adjustment means" according to the first aspect of the present invention is realized by the ECU 50 through execution of the fuel injection amount control based on the intake air flow corrected at step 210. In addition, "torque buildup request prediction means" and "pre-assist means" according to the eighth aspect of the present invention are realized by the CPU 50 through execution of steps 202 and 206, respectively.

Figure 5:
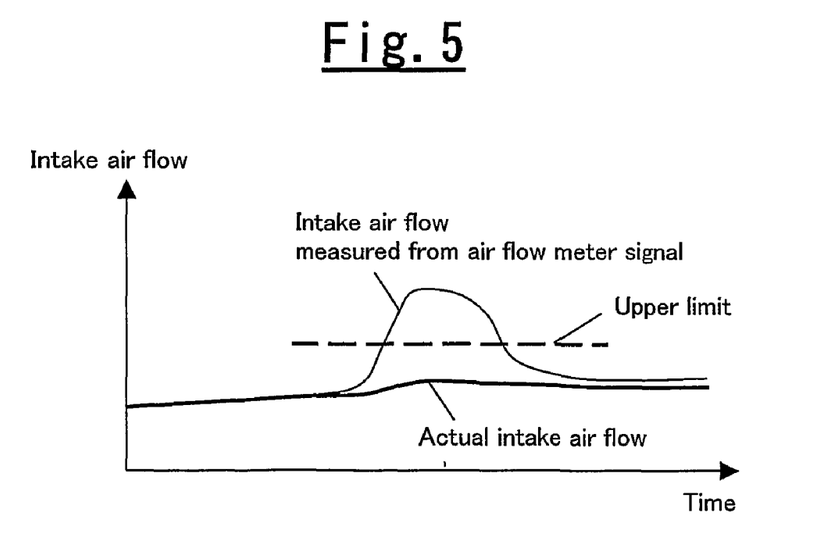
FIG. 5 is a graph that shows other intake air flow correction method in the pre-assist control according to the first embodiment of the present invention.

Although the intake air flow during the pre-assist is corrected in the above-mentioned embodiment by smoothing the signal of the air flow meter 52, it is also possible to use simpler correction methods. One example is to predict the maximum intake air flow into the engine body 2 from the engine rotation speed and throttle opening and set the maximum value as the upper limit of the intake air flow. By restricting the intake air flow measured from the signal of the air flow meter 52 below the upper limit, it is possible to approximate the actual air flow into the engine body 2 (actual intake air flow) or reduce the difference between the intake air flow measured from the signal of the air flow meter 52 and the actual intake air flow.

In addition, although in the above-mentioned embodiment, the bypass valve 42 is opened immediately after the motor assist is started for pre-assist, the bypass valve 42 may be kept closed in the same manner as the assist control routine until the compressor 30a reaches the surge limit. Correction of the intake air flow by smoothing the signal of the air flow meter 52 or setting an upper limit to the intake air flow can be executed immediately after the motor assist is started regardless of whether the bypass valve 42 is opened or not.

Second Embodiment

Figure 6:
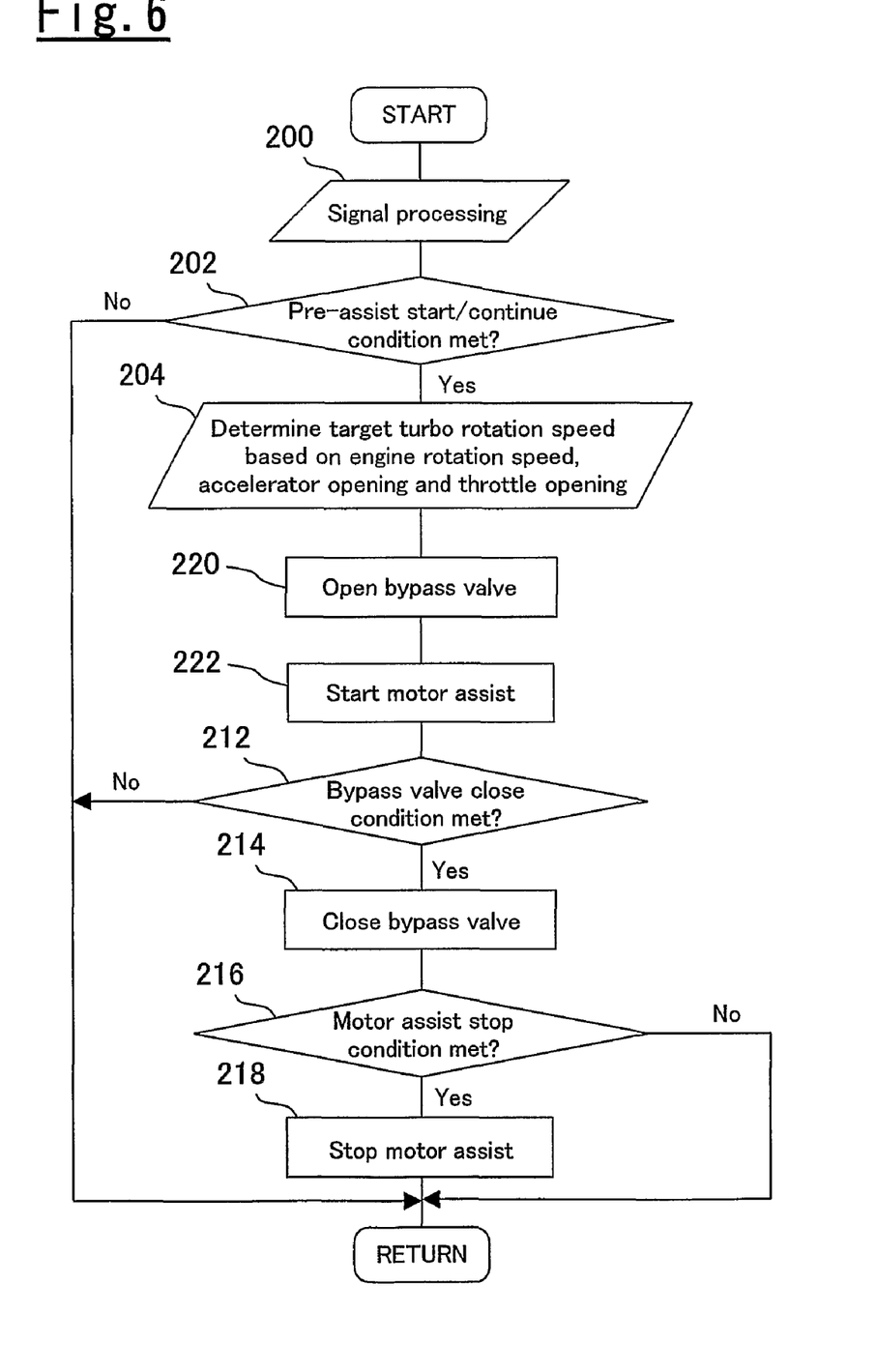
FIG. 6 is a flowchart illustrating a pre-assist control routine that is executed by the second embodiment of the present invention.

The following describes a second embodiment of the present invention with reference to FIG. 6.

A control apparatus for an internal combustion engine having a motor-driven supercharger, according to the present embodiment, is also implemented in the same configuration as FIG. 1. In the present embodiment, however, the control apparatus is implemented by making the ECU 50 execute a routine shown in FIG. 6 instead of the routine shown in FIG. 3.

[Description of Pre-assist Control]

The present control apparatus embodiment is different in terms of pre-assist control processing from the first control apparatus embodiment. FIG. 6 provides a flowchart showing a pre-assist control routine which is executed by the ECU 50. Each step of processing in the routine of FIG. 6 is given the same step number as the corresponding step, if any, in the routine of FIG. 3 if there is no difference in terms of processing. In addition, description of processing is omitted unless not already described.

In the pre-assist control according to the present embodiment as shown in FIG. 6, the bypass valve 42 is opened (step 220) before motor assist is started. That is, the outlet side of the compressor 30a is bypassed by the opened bypass valve 42 to the inlet side before the ECU 50 starts the assist of the electric motor 30c by supplying power, which is determined according to the target turbo rotation speed, from the ECU 50 to the electric motor 30c (step 222).

Since the bypass valve 42 is opened before the electric motor 30c is started to run, compression of the intake air by the compressor 30a is suppressed, resulting in a smaller pressure difference between the inlet and outlet of the compressor 30a. Therefore, since the air which flows into the bypass passage 40 is suppressed, almost all of the air which passes the compressor 30a is directly inhaled into the engine body 2.

Therefore, since the difference between the intake air flow measured from the signal of the air flow meter 52 and the actual air flow inhaled into the engine body 2 is very small, it is not necessary to correct the measured intake air flow in the present embodiment. That is, the fuel injection amount control can be done based on the accurate intake air flow by directly using the intake air flow measured from the signal of the air flow meter 52.

Note that in the present embodiment, "control parameter adjustment means" according to the ninth aspect of the present invention is realized by the ECU 50 through execution of the fuel injection amount control. Likewise, "torque buildup request prediction means", "pre-assist means" and "valve control means" according to the ninth aspect of the present invention are realized by the CPU 50 through execution of steps 202, 222 and 220, respectively.

Third Embodiment

Figure 7:
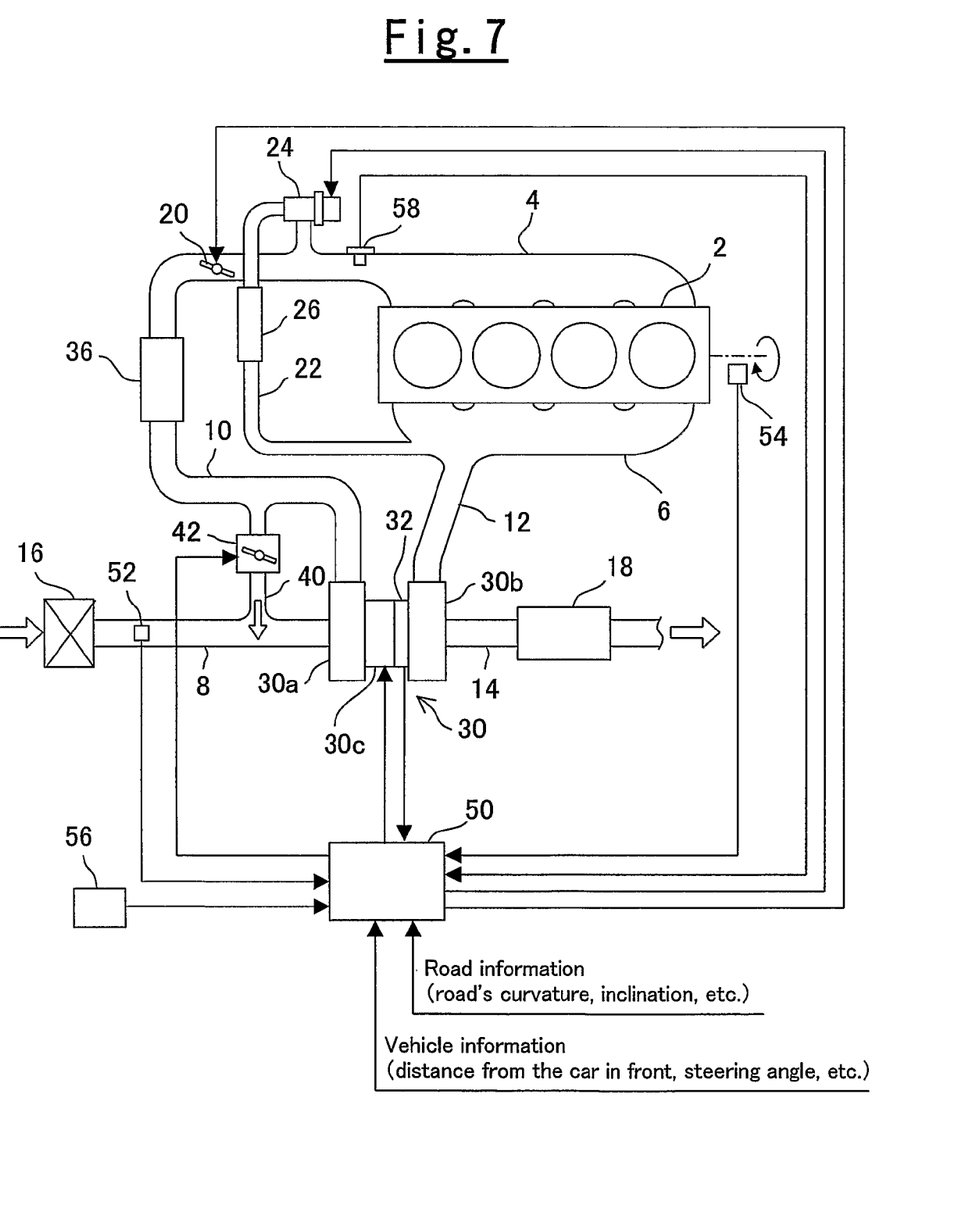
FIG. 7 schematically shows the configuration of an internal combustion engine having a motor-driven supercharger according to the third embodiment of the present invention.
Figure 8:
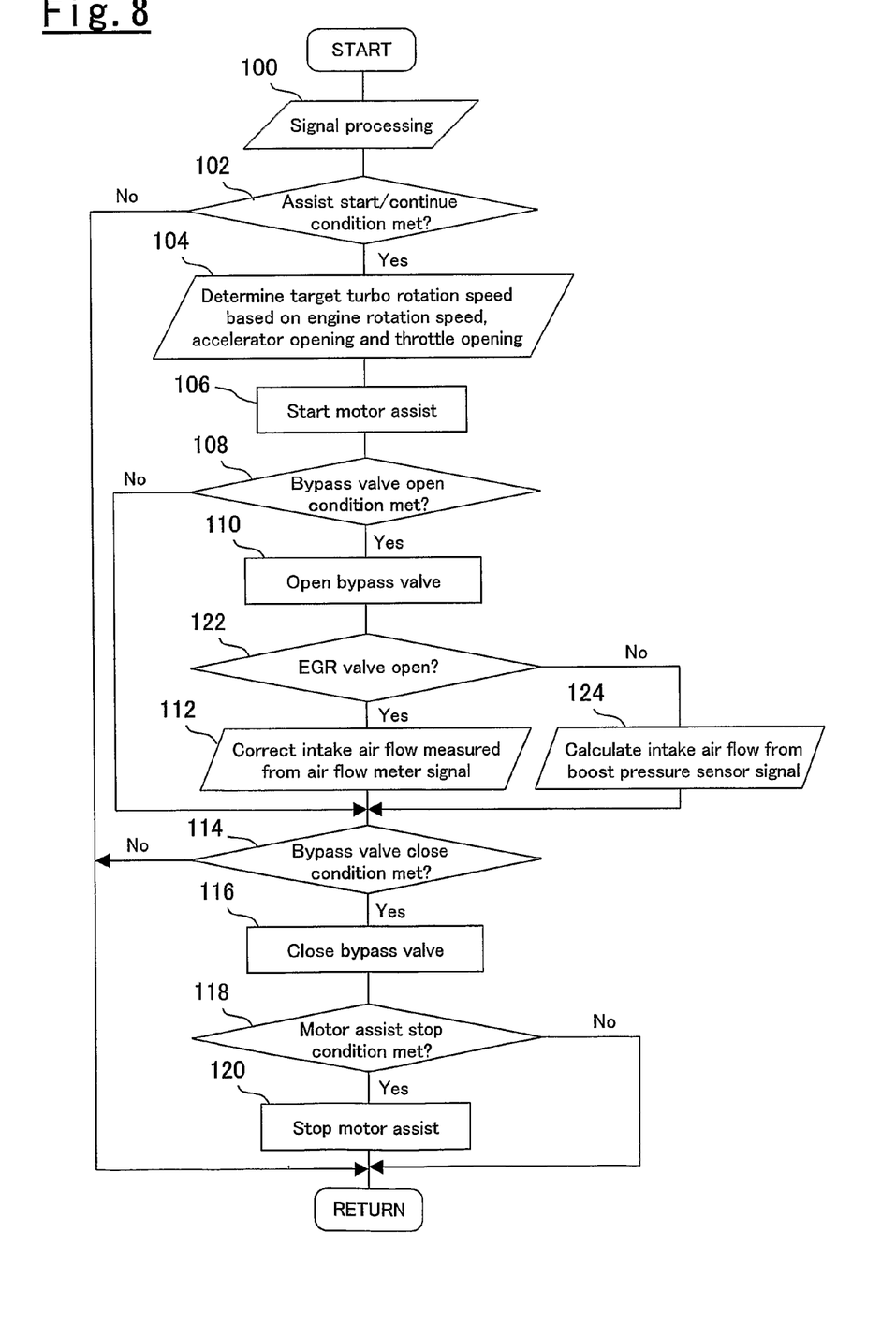
FIG. 8 is a flowchart illustrating an assist control routine that is executed by the third embodiment of the present invention.

The following describes a third embodiment of the present invention with reference to FIGS. 7 and 8.

[Description of Engine System Configuration]

FIG. 7 schematically shows the configuration of an internal combustion engine having a motor-driven supercharger where a third control apparatus embodiment of the present invention is applied. Each component in FIG. 7 is given the same reference numeral as the corresponding one, if any, shown in FIG. 1. In addition, configurational description is omitted unless not already described.

The engine according to the present embodiment is different from the engine according to the first embodiment in that an EGR is included. As shown in FIG. 7, an EGR passage 22 is connected to the intake passage 10 between the throttle valve 20 and the intake manifold 4. The opposite end of the EGR passage 22 is connected to the exhaust manifold 6. The EGR passage 22 is provided with an EGR cooler 26 to cool the EGR gas which flows therein. Downstream of the EGR cooler 26, the EGR passage 22 is provided with an EGR valve 24 to control the passage area of the EGR passage 22. These EGR passage 22, EGR valve 24 and EGR cooler 26 constitute an EGR apparatus.

Since the intake passage 10 and the exhaust manifold 6 are connected by the EGR passage 22, part of the exhaust gas (EGR gas) is introduced into the intake passage 10 via the EGR passage 22. The amount of EGR gas introduced into the intake passage 10 (EGR flow) can be controlled by the opening of the EGR valve 24. The opening of the EGR valve 24 is controlled by the ECU 50 based on the operating state of the engine.

Downstream of the connection with the EGR passage 22, the intake passage 10 is provided a boost pressure sensor 58. The boost pressure sensor 58 outputs a signal indicative of the internal air pressure of the intake passage 10. Since the air pressure in the intake passage 10 is consistent with the air flow therein, it can be said that the boost pressure sensor 58 outputs a signal indicative of the air flow in the intake passage 10. Therefore, from the signal of the boost pressure sensor 58, it is possible to measure the air flow inhaled into the engine body 2 via the intake passage 10. The boost pressure sensor 58 is connected to the input side of the ECU 50. The signal of the boost pressure sensor 58 is used by the ECU 50 to control the engine.

[Description of Assist Control]

The present control apparatus embodiment is different also in terms of assist control processing from the first control apparatus embodiment. FIG. 8 provides a flowchart showing an assist control routine which the ECU 50 executes in the present embodiment. Each step of processing in the routine of FIG. 8 is given the same step number as the corresponding step, if any, in the routine of FIG. 2 if there is no difference in terms of processing. In addition, description of processing is omitted unless not already described.

In the assist control according to the present embodiment, calculation of the amount of intake air is switched depending on whether the EGR valve 24 is open. Specifically, as shown in FIG. 8, after the bypass valve 42 is opened at step 110, it is judged whether the EGR valve 24 is open (step 122). If the EGR valve 24 is closed, the air flow inhaled into the engine body 2 is calculated from the signal of the boost pressure sensor 58 (step 124). Using the signal of the boost pressure sensor 58 makes it possible to accurately calculate the air flow inhaled into the engine body 2 not under influence of the air-bypass.

However, when the EGR valve 24 is open to introduce exhaust gas into the intake passage 10, the gas flow measured from the signal of the boost pressure sensor 58 is different from the air flow inhaled actually into the engine body 2 due to the exhaust gas flow. Therefore, when the EGR valve 24 is open, correction of the intake air measured from the signal of the air flow meter 52 is done in the same manner as in the first embodiment (step 112).

According to the above-mentioned routine, even when the EGR apparatus is active or when the EGR valve 24 is open, it is possible to accurately calculate the intake air flow inhaled into the engine body 2 in a transient state immediately after air-bypass is started by subtracting the bypass air flow from the amount of air inhaled into the intake passage 8. Thus, even when exhaust gas is introduced into the intake passage 10, the fuel injection amount can be controlled based on the accurate intake air flow.

Note that in the present embodiment, "calculation means" according to the sixth aspect of the present invention is realized by the ECU 50 through execution of step 122, 124 or 112. In addition, the boost pressure sensor 58 corresponds to the "gas property sensor" according to the sixth aspect of the present invention.

Others

While embodiments of the present invention have so far been described, the present invention is not limited to these specific embodiments. Various modifications may be done without departing from the spirit of the present invention. The following describes examples of such modifications.

Pre-assist control in the first embodiment smoothens the signal of the air flow meter 52 during the execution of air-bypass. The intake air flow measured from the smoothed signal is taken as the air flow inhaled into the engine body 2. This may be modified so as to smooth the signal of the air flow meter 52 only during a transient period just after air-bypass is started. Like the assist control, the air flow inhaled into the engine body 2 just after air-bypass is started may also be determined by correcting the intake air flow measured from the signal of the air flow meter 52, namely subtracting the bypass air flow from the measured intake air flow.

In addition, the third embodiment may be modified so as to perform the pre-assist control by using either the pre-assist control method in the first embodiment or that in the second embodiment. While the EGR apparatus is not active, the air flow inhaled into the engine body 2 may also be calculated from the signal of the boost pressure sensor 58 in the same manner as the assist control in the third embodiment.

In addition, while the third embodiment has the boost pressure sensor 58 disposed downstream of the throttle valve 20 in the intake passage 10, an air flow meter which outputs a signal indicative of the air flow may be disposed in place of the boost pressure sensor 58.

The invention claimed is:

1. A control apparatus for an internal combustion engine comprising:
    a supercharger which is disposed in an intake passage and provided with an electric motor that assists the rotation of the supercharger;
    a bypass passage which bypasses the downstream side of the supercharger to the upstream side of the supercharger in the intake passage;
    a bypass valve which opens and closes the bypass passage;
    an intake air flow sensor which is disposed upstream of the supercharger in the intake passage and outputs a signal indicative of the air flow inhaled into the intake passage;
    calculation means for calculating the air flow inhaled into the internal combustion engine based on an operational state of the electric motor, an operational state of the bypass valve, and the signal of the intake air flow sensor; and
    control parameter adjustment means for adjusting control parameters which concern output power of the internal combustion engine based on the air flow inhaled into the internal combustion engine.

2. The control apparatus for an internal combustion engine having a motor-driven supercharger according to claim 1 wherein the calculation means calculates the air flow inhaled into the internal combustion engine, immediately after the bypass valve is opened with the electric motor running, by acquiring the bypass air flow going through the bypass passage from the downstream side to the upstream side of the supercharger and using the acquired bypass air flow to correct the intake air flow measured from the signal of the intake air flow sensor.

3. The control apparatus for an internal combustion engine having a motor-driven supercharger according to claim 2
wherein the calculation means calculates the bypass air flow from output pressure of a compressor of the supercharger, and
wherein the output pressure of the compressor is calculated based on the intake air flow and rotation speed of the supercharger, and the opening of the bypass valve.

4. The control apparatus for an internal combustion engine having a motor-driven supercharger according to claim 1
wherein the calculation means calculates the air flow inhaled into the internal combustion engine, immediately after the bypass valve is opened with the electric motor running, by smoothing electric noise of the signal of the intake air flow sensor, and taking the smoothed signal of the intake air flow sensor as the intake air flow inhaled into the internal combustion engine.

5. The control apparatus for an internal combustion engine having a motor-driven supercharger according to claim 1 wherein the calculation means calculates the air flow inhaled into the internal combustion engine, immediately after the bypass valve is opened with the electric motor running, by predicting the maximum value of the air flow to be inhaled into the internal combustion engine based on the rotation speed and throttle opening of the internal combustion engine, setting the maximum value as the upper limit to the intake air flow measured from the signal of the intake air flow sensor, and taking the result as the air flow inhaled into the internal combustion engine.

6. The control apparatus for an internal combustion engine having a motor-driven supercharger according to claim 1 wherein the internal combustion engine further comprises:
an EGR apparatus which introduces part of the exhaust gas into the intake passage at an exhaust gas inlet downstream of the throttle; and
a gas property sensor which is disposed downstream of the exhaust gas inlet and outputs a signal indicative of the pressure or flow of the gas inhaled into the internal combustion engine,
wherein the calculation means calculates the air flow inhaled into the internal combustion engine based on the signal of the gas property sensor when the EGR apparatus is not active, and calculates the air flow inhaled into the internal combustion engine based on the operational state of the electric motor, the operational state of the bypass valve, and the signal of the intake air flow sensor when the EGR apparatus is active.

7. The control apparatus for an internal combustion engine having a motor-driven supercharger according to claim 1, further comprising:
surge avoidance means for judging a surge condition of the supercharger when the electric motor is running and, if it is judged that surge avoidance should be done, opens the bypass valve.

8. The control apparatus for an internal combustion engine having a motor-driven supercharger according to claim 1, further comprising:

torque buildup request prediction means for predicting a torque buildup request from the driver in advance based on road information or vehicle information; and
pre-assist means for raising the rotation speed of the supercharger by running the electric motor if the torque buildup request is predicted.

9. The control apparatus for an internal combustion engine having a motor-driven supercharger according to claim 1, wherein the calculation means corrects the signal of the intake air flow sensor by accounting for a bypass air flow going through the bypass passage from the downstream side to the upstream side of the supercharger.

10. A control apparatus for an internal combustion engine comprising:
a supercharger which is disposed in an intake passage and provided with an electric motor that assists the rotation of the supercharger;
a bypass passage which bypasses the downstream side of the supercharger to the upstream side of the supercharger in the intake passage;
a bypass valve which opens and closes the bypass passage;
an intake air flow sensor which is disposed upstream of the supercharger in the intake passage and outputs a signal indicative of the air flow inhaled into the intake passage;
calculation device for calculating the air flow inhaled into the internal combustion engine based on an operational state of the electric motor, an operational state of the bypass valve, and the signal of the intake air flow sensor; and
control parameter adjustment device for adjusting control parameters which concern output power of the internal combustion engine based on the air flow inhaled into the internal combustion engine.

11. The control apparatus for an internal combustion engine having a motor-driven supercharger according to claim 10 wherein the calculation device calculates the air flow inhaled into the internal combustion engine, immediately after the bypass valve is opened with the electric motor running, by acquiring the bypass air flow going through the bypass passage from the downstream side to the upstream side of the supercharger and using the acquired bypass air flow to correct the intake air flow measured from the signal of the intake air flow sensor.

12. The control apparatus for an internal combustion engine having a motor-driven supercharger according to claim 11
wherein the calculation device calculates the bypass air flow from output pressure of a compressor of the supercharger, and
wherein the output pressure of the compressor is calculated based on the intake air flow and rotation speed of the supercharger, and the opening of the bypass valve.

13. The control apparatus for an internal combustion engine having a motor-driven supercharger according to claim 10
wherein the calculation device calculates the air flow inhaled into the internal combustion engine, immediately after the bypass valve is opened with the electric motor running, by smoothing electric noise of the signal of the intake air flow sensor, and by taking the smoothed signal of the intake air flow as the intake air flow inhaled into the internal combustion engine.

14. The control apparatus for an internal combustion engine having a motor-driven supercharger according to claim 10 wherein the calculation device calculates the air flow inhaled into the internal combustion engine, immediately after the bypass valve is opened with the electric motor running, by predicting the maximum value of the air flow to be inhaled into the internal combustion engine based on the rotation speed and throttle opening of the internal combustion engine, setting the maximum value as the upper limit to the intake air flow measured from the signal of the intake air flow sensor, and taking the result as the air flow inhaled into the internal combustion engine.

15. The control apparatus for an internal combustion engine having a motor-driven supercharger according to claim 10 wherein the internal combustion engine further comprises:
   an EGR apparatus which introduces part of the exhaust gas into the intake passage at an exhaust gas inlet downstream of the throttle; and
   a gas property sensor which is disposed downstream of the exhaust gas inlet and outputs a signal indicative of the pressure or flow of the gas inhaled into the internal combustion engine,
      wherein the calculation device calculates the air flow inhaled into the internal combustion engine based on the signal of the gas property sensor when the EGR apparatus is not active, and calculates the air flow inhaled into the internal combustion engine based on the operational state of the electric motor, the operational state of the bypass valve, and the signal of the intake air flow sensor when the EGR apparatus is active.

16. A control apparatus for an internal combustion engine comprising:
   a supercharger which is disposed in an intake passage and provided with an electric motor that assists the rotation of the supercharger;
   a bypass passage which bypasses the outlet side of the supercharger in the intake passage to the inlet side of the supercharger;
   a bypass valve which opens and closes the bypass passage; and an intake air flow sensor which is disposed upstream of the supercharger in the intake passage and outputs a signal indicative of the air flow inhaled into the intake passage;
   control parameter adjustment means for adjusting control parameters which concern output power of the internal combustion engine based on the air flow inhaled into the internal combustion engine;
   torque buildup request prediction means for predicting a torque buildup request from the driver in advance based on road information or vehicle information;
   pre-assist means for raising the rotation speed of the supercharger by running the electric motor if said torque buildup request is predicted;
   an valve control means for opening the bypass valve before running the electric motor if the torque buildup request is predicted and
   calculation means for calculating the air flow inhaled into the internal combustion engine based on an operational state of the electric motor, an operational state of the bypass valve, and the signal of the intake air flow sensor.

17. The control apparatus for an internal combustion engine having a motor-driven supercharger according to claim 16, wherein the control parameter adjustment means adjusts the control parameters based on the air flow inhaled into the internal combustion engine.

18. A control apparatus for an internal combustion engine comprising:
   a supercharger which is disposed in an intake passage and provided with an electric motor that assists the rotation of the supercharger;
   a bypass passage which bypasses the outlet side of the supercharger in the intake passage to the inlet side of the supercharger;
   a bypass valve which opens and closes the bypass passage; and an intake air flow sensor which is disposed upstream of the supercharger in the intake passage and outputs a signal indicative of the air flow inhaled into the intake passage;
   a control parameter adjustment device for adjusting control parameters which concern output power of the internal combustion engine based on the air flow inhaled into the internal combustion engine;
   a torque buildup request prediction device for predicting a torque buildup request from the driver in advance based on road information or vehicle information;
   a pre-assist device for raising the rotation speed of the supercharger by running the electric motor if said torque buildup request is predicted;
   a valve control device for opening the bypass valve before running the electric motor if the torque buildup request is predicted; and
   a calculation device that calculates the air flow inhaled into the internal combustion engine based on an operational state of the electric motor, an operational state of the bypass valve and the signal of the intake air flow sensor.

* * * * *